United States Patent

[11] 3,550,728

| [72] | Inventors | Hermann Seip<br>Bad Vilbel;<br>Erich Rabich, Sprendlingen, Germany |
|---|---|---|
| [21] | Appl. No. | 787,903 |
| [22] | Filed | Dec. 30, 1968 |
| [45] | Patented | Dec. 29, 1970 |
| [73] | Assignee | Alfred Teves G.m.b.H.<br>Frankfurt am Main, Germany<br>a corporation of Germany |
| [32] | Priority | Jan. 8, 1968 |
| [33] | | Germany |
| [31] | | No. T35655 |

[54] DISK-BRAKE ADJUSTMENT MECHANISM WITH STEPLESS UNIDIRECTIONAL RADIAL CLUTCH
9 Claims, 6 Drawing Figs.

[52] U.S. Cl. ................................................ 188/71.8,
188/196
[51] Int. Cl. ........................................ F16d 65/52
[50] Field of Search .......................................... 188/73,
73C, 196RR, PRR, 106F, 79.5GE

[56] References Cited
UNITED STATES PATENTS

| 2,184,683 | 12/1939 | Shuman | 188/79.5(GE) |
| 3,331,472 | 7/1967 | Swift | 188/73(C) |
| 3,334,709 | 8/1967 | Russell | 188/79.5(GE) |
| 3,442,357 | 5/1969 | Farr | 188/196(PRR) |

FOREIGN PATENTS

| 1,073,829 | 6/1967 | Great Britain | 188/73(C) |

*Primary Examiner*—George E. A. Halvosa
*Attorney*—Karl F. Ross

ABSTRACT: A wear-compensating disc brake in which the wheel brake cylinder is hydraulically, pneumatically or mechanically pressurizable to urge the piston and its brakeshoe against the disc has, in at least one yoke half of its housing, spring means for applying a restoring force to the piston whose return stroke is limited by a rotatable nut threaded on a bolt during normal operation in the cylinder wall. The bolt can be rotated from outside the housing to withdraw the piston. The nut is rotated by a cam arrangement having a pin engaged in a skew slot in a camming member or sleeve which is effective during the forward stroke of the piston to advance the sleeve on the bolt and establish a new rest position for the piston when the stroke of the latter exceeds the desired brake play. The camming member is connected with the piston by a stepless, unidirectionally effective radial clutch for angular movement only in the nut advancing direction.

HERMANN SEIP
ERICH RABICH
*INVENTOR.*

BY

Karl G. Ross

ATTORNEY 3,550,728

DISK-BRAKE ADJUSTMENT MECHANISM WITH STEPLESS UNIDIRECTIONAL RADIAL CLUTCH

SPECIFICATION

The present invention relates to an improved adjustment mechanisms for disc brakes.

REFERENCE TO EARLIER APPLICATION

In the commonly assigned copending application Ser. No. 700,515, now U.S. Pat. No. 3,498,423 filed 25 Jan. 1968 by Juan Belart and entitled "ADJUSTING DEVICE FOR disc BRAKE," there is disclosed an adjustment mechanism for a disc brake which applies certain principles originally set forth in the copending application Ser. No. 655,150 filed 21 Jul. 1967 by Juan Belart (now U.S. Pat. No. 3,467,227). In that application, a disc brake arrangement is described in which a hydraulic piston is axially shiftable in a cylinder to drive a proximal brakeshoe against a disc rotatable about an axis parallel to the axis of the cylinder. The self-adjusting means comprises a threaded spindle which is screwed into the cylinder wall remote from the brakeshoe and cooperates with an axially shiftable sleeve. The threaded spindle or bolt, which forms a stop for the piston, is provided with cam means constituted in part by a radial pin which is shiftable along an inclined camming surface of the sleeve which is axially shiftable with a lost motion determined by the pin and a stop ring carried by the bolt. A torsion spring is provided between the sleeve and the pin to continuously urge the camming surface against the latter, angular rotation of the sleeve during the forward piston stroke being limited by frictional means.

As set forth in application Ser. No. 700,515, the rest position of the piston and, therefore, its limiting position upon the return stroke, is established by an abutment carried by the threaded spindle or bolt which passes coaxially through the wheel brake cylinder and the piston is screwed into the end wall at the close side of the cylinder. During the forward movement of the piston, the rotatable sleeve is advanced axially to cam the bolt and advance the rest position only upon displacement of the piston beyond the predetermined normal play thereof. This construction allows the piston to move within its normal play without any stepping of the adjusting means but, as soon as the normal play is exceeded, brings the camming arrangement into operation to advance the rest position of the piston. The system thus permits of continuous adjustment to greater or lesser degrees in dependence upon the wear of the brake lining which tends to increase the brake play.

This system also provides that the threaded bolt has its screw thread formed along the shank of the bolt remote from the brake disc and the piston while the balance of the bolt is unthreaded and passes axially through the piston. In this unthreaded portion, there is provided a pair of axially spaced circumferential grooves within the piston, the groove proximal to the brakeshoe and disc receiving an abutment ring which, upon engagement with the inner surface of the end wall of the cup-shaped system, establishes the rest position of the latter. The other groove, remote from the brake disc receives a stop ring which engages the camming sleeve to limit its displacement away from the disc.

The nonthreaded portion of the bolt, which is screwed axially into the housing in which the wheel brake cylinder is formed, also carries within the hollow piston the camming means which is axially shiftable by the piston upon its displacement beyond the predetermined brake play to rotate the bolt or spindle and thereby advance the abutment formed by the ring locked in a groove of the bolt proximal to the brake disc. The piston is open axially away from the disc and is formed at the end of the piston chamber with a wall through an opening of which the nonthreaded portion of the bold extends axially. The abutment is thus formed by a ring engaging this wall adjacent the opening, the ring simultaneously forming a stop for a spring seat against which a helical coil or leaf spring acts. The spring, which continuously urges the piston away from the disc in the restoring or return direction, must be overcome by the hydraulic pressure for brake operation. The other end of the spring acts via an annular seat or tongues formed directly on the spring against a friction ring which rests against the end of the piston distal from the disc. To this end, an inwardly open annular groove may be provided in the wall of the piston chamber to receive a split ring against which the friction ring is held via the restoring spring.

In the system of application Ser. No. 655,150, the camming means can be constituted by a camming body, e.g. a sleeve, which is axially and rotatably movable on the nonthreaded portion of the bolt and may rest against another stop ring anchored in a groove of the bolt spaced from the abutment thereof which defines the rest portion of the piston. The sleeve is provided with a camming surface inclined to the axis of the bolt or to a generatrix of the sleeve by 20° to 45°, the camming surface cooperating with a transverse pin anchored to the bolt. The camming body is further provided with a plurality of angularly equispaced, radially extending arms which are axially engageable with the friction ring to form a clutch limiting rotation of the camming body with respect to the bolt. A torsion spring engages this pin and the body to restore the original positions of the camming surface and pin upon advance of the bolt to reset the rest position of the piston. Additionally, it has been found advantageous to anchor the bolt in a blind bore of the housing, an axially extending passage being formed in the threaded portion of the bolt and communicating with the cylinder to prevent buildup of the pressure in this bore when the bolt is threaded into the latter.

OBJECTS OF THE INVENTION

It is the principal object of the present invention to provide an improved disc brake adjustment mechanism which extends the principles described above.

A further object of the present invention is to provide a shorter disc brake equipped with an adjustment or adjusting mechanism according to the present invention.

A yet further object is to provide such an adjustment mechanism which can be reset from outside the housing and which is more easily actuated by the spring means.

BRIEF DESCRIPTION OF THE INVENTION

In accordance with the present invention, by making the bolt or spindle normally nonrotatable and providing a threaded rotatable nut on one end of it in this manner, the nut alone rotates to adjust the brake, obviating the necessity of a troublesome seal around the exposed end of the adjustment bolt and the necessity of rotating the bolt during adjustment operations in the seal.

In accordance with a further feature of the present invention, this bolt, or these bolts in the case of a two-cylinder fixed-yoke disc brake, can be led out of the housing and fixed there by such means as a worm gear meshing with a toothed end of the bolt or simply by leading one of the ends of the bolt out of the housing and providing exterior resetting means for fixing and turning this bolt.

It has been found that the brake disc usually made of cast iron, tends to rust near its edge, thereby making it extremely difficult to remove and replace worn shoes. With the system of the present invention, the exposed end of the bolt, or a gear means or star wheel resetting device coupled to the end of the bolt, is rotatable from outside the housing thereby permitting traction of the adjustment mechanism and simultaneous freeing of the shoes without dismantling the yoke or caliper.

Another feature of the invention provides for cam means in the adjustment mechanism which comprises s spring body made from a short length of leaf spring. This spring has a bent end that engages in a groove or notch in a camming member which has an inclined or skew slot that is engaged by a pin mounted on the sleeve as the pin on the bolt in the above-cited applications. The other end of the spring body rubs the inside of the hollow piston to permit rotation in only one direction of the sleeve like a free running or unidirectional clutch. The width of the groove is greater than that of the spring; This excess width corresponds to the desired brake play since the leaf spring customarily lies against one flank of the notch and, on actuation of the brakes, must be pushed by the other flank before it is moved. Such an arrangement makes for an extremely compact and sure adjustment mechanism.

With such an adjustment mechanism the brake is adjusted only when the brake play is more than a predetermined desired brake play; it is not readjusted on each actuation of the brakes. This presents a sizable advantage over many prior art brakes, since the improved adjustment mechanism will tend to wear very little. What is more, the adjustment cannot be falsely carried out, or the brakes overadjusted. An overadjustment often results from prior adjustment mechanisms responding to saddle or housing deformation and advancing the shoes excessively so that they cannot be retracted from contact with the disc.

BRIEF DESCRIPTION OF THE FIGURES

The above and other features, objects and advantages of the present invention will become more readily apparent from the following description, reference being made to the accompanying drawing in which.

SPECIFIC DESCRIPTION

Figure 1:
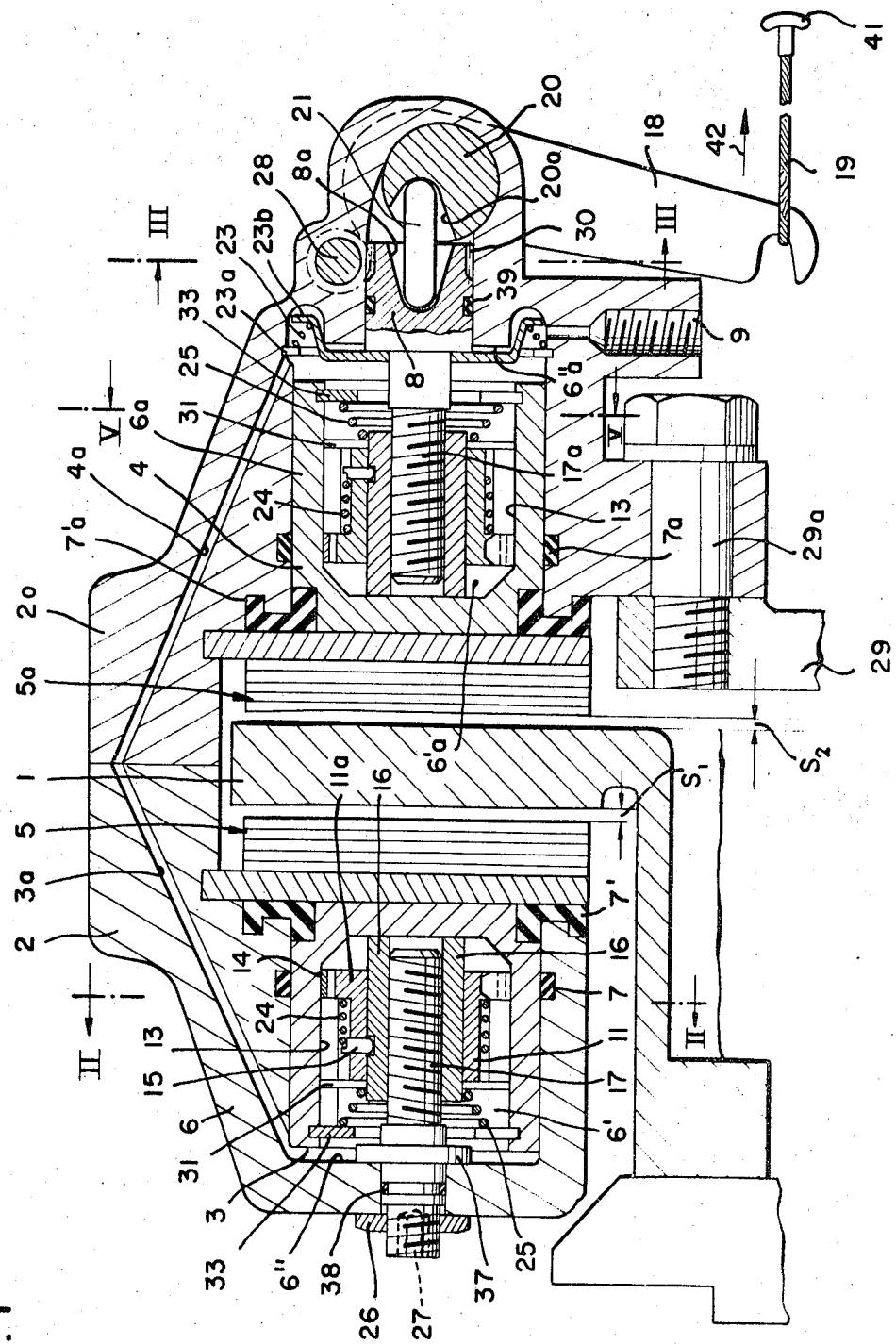
FIG. 1 is an axial section through a brake equipped with the adjustment mechanism according to the present invention.

As shown in FIG. 1, a fixed-saddle disc brake has two yoke or caliper halves or lobes 2 and 2a arranged on each side of a brake disc 1. Each lobe 2 and 2a has a cylinder 3 or 4 in which a piston 6 or 6a is axially movable away from a respective rear wall 6'' and 6a'' to force a brakeshoe 5 or 5a respectively against the disc 1. Brake fluid under pressure is fed into an inlet 9 in the cylinder 4 from a master cylinder (not shown) and flows through passages 4a and 3a into the cylinder 3. The right-hand or fixed lobe 2a is mounted upon the axle-housing flange 29 by means of a bolt 29a. The piston 6 and 6a are sealed by seals 7 and 7a and cuffs 7' and 7a', respectively.

The adjustment mechanism for the piston 6 includes a bolt 17 while the piston 6a is correspondingly provided with a bolt 17a. The piston 6 and 6a have hollow interiors 6' and 6a' housing the respective adjustment mechanism.

The left-hand adjustment mechanism, with the bolt 17, will now be illustratively described, although the functioning of the right-hand mechanism, with the bolt 17a, is substantially identical. The bolt 17 carries a threaded nut 16 on which a pin 15 is fixedly mounted. This nut 16 engages the end wall 13 of the piston 6 and forms an abutment for it.

Figure 2:
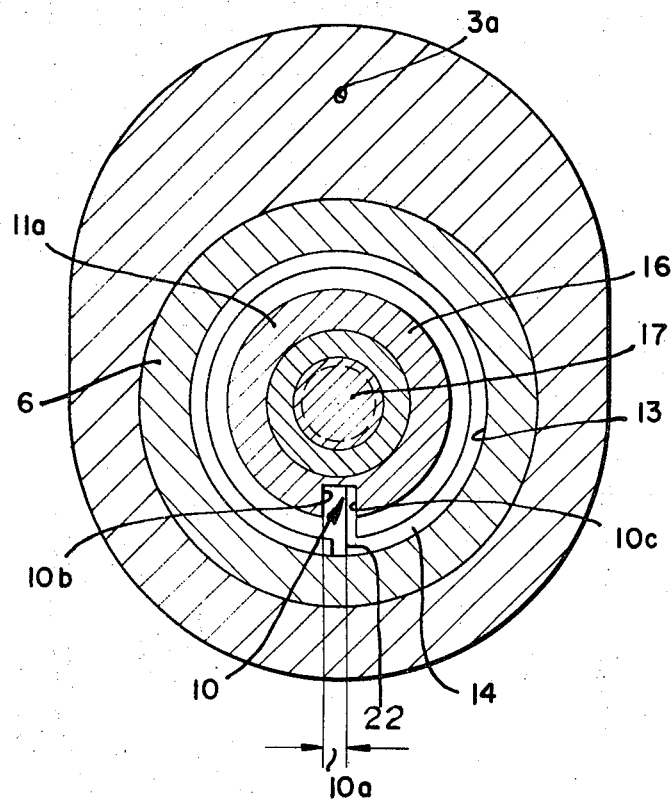
FIGS. 2 and 3 are cross sections taken along lines II-II and III-III of FIG. 1, respectively.
Figure 4:
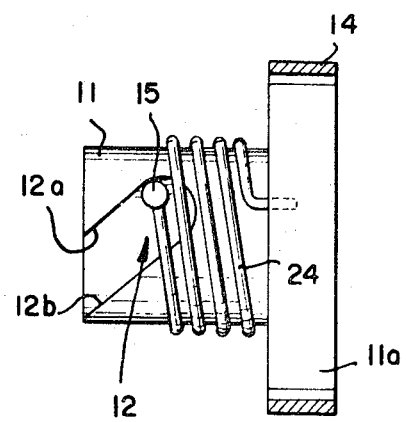
FIG. 4 is a detail of FIG. 1.

As seen better in FIG. 4, a camming member 11 with a flange end 11a and a slot 12 is carried by the sleeve 16. This slot 12 is inclined or skewed and has two flanks 12a and 12the flank 12a being urged into contact with the pin 15 by a torsion spring 24 anchored on the flange 11a and the pin 15. A leaf spring 14 best shown in FIG. 2 acts as a free running or unidirectional clutch for the flange portion 11a by engaging in, with an end 22, a notch or groove 10 of the portion 11a and rubbing against the inside of the piston 6. The groove 10 has flanks 10b and 10c and is substantially wider than the spring 14 and leaves a gap 10a between this and the flank 10b of the notch 10 as shown in FIG. 2.

Figure 5:
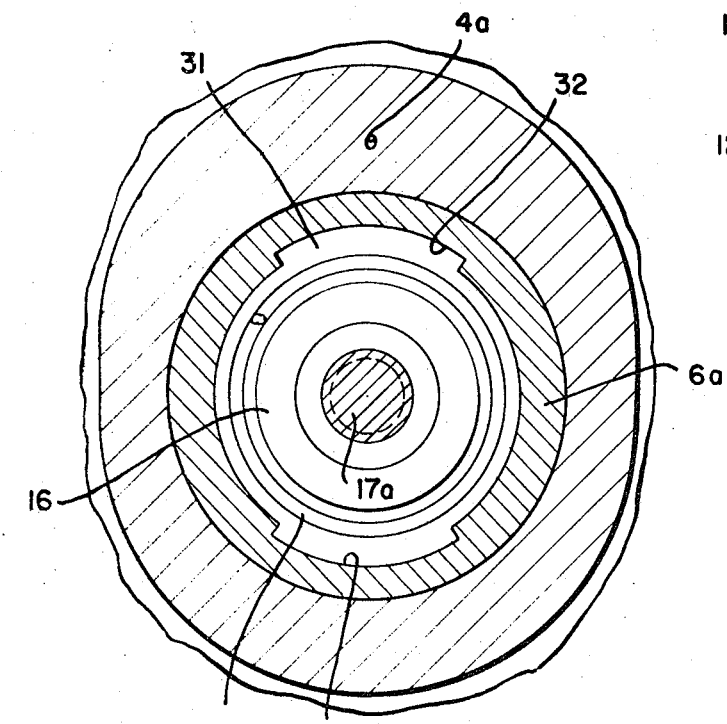
FIG. 5 is a section taken along line V-V of FIG. 1.

FIG. 5 shows the nonrotatable disc 31 engaged in slots 32 in the piston 6a and acting as an abutment for a spring 25, also seen in FIG. 1, which is braced against a snap ring 33 mounted in the piston 6a to urge the piston 6a back from the disc 1. A similar arrangement is provided for the piston 6.

The bolt 17 passes through the wall of the lobe 2 and is formed with a small square or hexagonal opening 27 in its exposed end adapted to receive a tool. The bolt 17 further has a shoulder 37 which bears against the inside of the cylinder 3 while a nut 26 engages the outside end of the bolt 17 and clamps it against the half 2. A seal 38 prevents leakage at this point.

Figure 3:
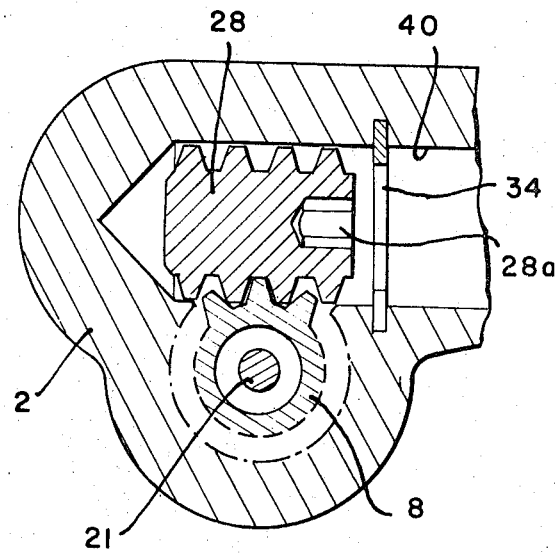

The bolt 17a has a broad end 8 with a seal 39 and formed with a cup-shaped seat 8a and gear teeth 30. These teeth 30 are engaged by a worm 28 at right-angles to the bolt 17a as shown in FIG. 3. This worm 28 is rotatable in a bore 40 but is hindered from axial movement by a snap ring 34. It is formed with a hexagonal hole 28a adapted to receive an Allen wrench or the like. In addition, the worm 28 fits so tightly in the bore 40 that it does not rotate readily, and will not rotate under the effects of vibration to allow the bolt 17a to turn.

Figure 6:
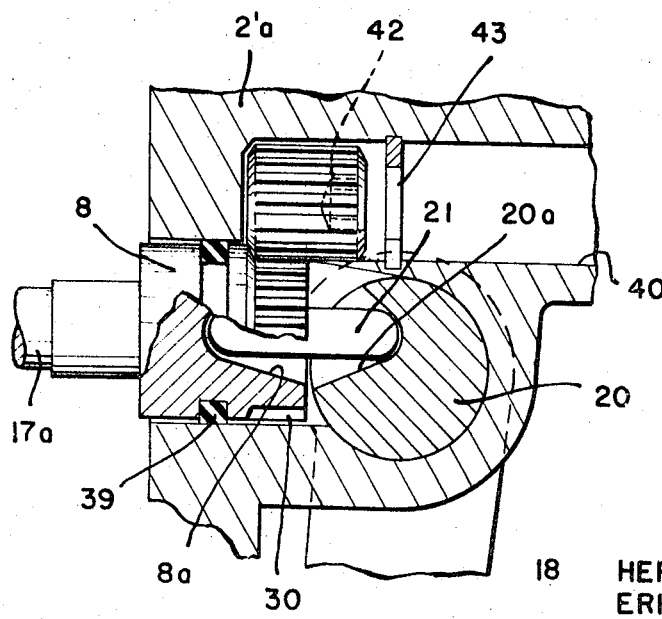
FIG. 6 is a detail similar to FIG. 1 showing a further embodiment of the adjustment mechanism in accordance with the present invention.

FIG. 6 shows a similar arrangement wherein however, the gear 42 held by a snap ring 43 engages the teeth 30. This gear 42 is rotatable as the worm 28 is, but here rotates about an axis parallel to that of the bolt 17a.

Received in the seat 8a is a rod link 21 which is also engaged in an eccentric seat 20a in a spindle 20 such that clockwise rotation of the spindle 20 will force the bolt 17a to the left (FIG. 1). An arm 18 is connected to this spindle 20 and, through a cable 19 to a handle 41 of a hand brake.

A spring 23 braced between a seat 23b on the head 8 and a ring 23a in the cylinder 4 urges the bolt 17a, and therefore the piston 6a, away from the disc 1.

OPERATION

When hydraulic fluid is fed to the wheel brake cylinders 3 and 4 behind the pistons 6 and 6a, via the brake fluid inlet 9 and the connecting passages 3a and 4a, the pistons 6 and 6a are urged respectively to the right and left (FIG. 1) and apply braking force to the backing plates of the respective breakshoes 5 and 5a. The initial movement of the pistons and their brakeshoes takes up the brake play $S_1$ and $S_2$ to bring the brakeshoes into contact with the disc 1 at the faces of the brake linings confronting the disc. Up to this point, the actuation of the brake is entirely conventional.

If there has been no significant brake lining wear, the frictional engagement of the brakeshoes 5 and 5a with the respective braking faces of the disc 1 will effect a frictional contact and brake the rotation of the disc at a rate determined by the force applied by the vehicle operator to the brake pedal and, consequently, the pressure of the fluid at inlet a.

When the movement of the brakeshoes 5, 5a exceeds the predetermined brake play $S_1$, $S_2$ (equivalent to the distance 10a by which the width of the axial slot 10 in camming sleeve 11 exceeds the thickness of the lug 22 of spring 14), the additional axial displacement of the brakeshoes to bring them into engagement with the disc is a measure of the wear of the brake lining from prior brake operating cycles. Assuming such brake wear, therefore, it will be seen that the pistons 6 and 6a also advance to the right and left, respectively, axially entraining the camming sleeve 11.

Since the nut 16 in threaded engagement with spindle 17 remains stationary during the initial movement of the piston 6 or 6a, the sleeve 11 will be angularly displaced until the lug 22 moves from engagement with flank 10c into engagement with flank 10b of the groove 10 (FIG. 2). This angular movement of sleeve 11 is caused by its axial displacement relative to the temporarily stationary pin 15 and corresponds to the taking up of the brake play mentioned earlier.

A further axial displacement of each piston 6 and 6a, together with its camming sleeve 11, will produce no further rotation of this latter sleeve since the radially effective clutch spring 14, when entrained in the counterclockwise sense by the flank 10b of slot 10 as shown in FIG. 2, will tend to spread the spring 14 outwardly and frictionally lock the spring to the inner wall of the pistons 6, 6a. Since the sleeve 11 cannot rotate relative to the spindle 17 or 17a or relative to its piston 6 or 6a, the additional axial displacement of the spring will result in a camming of the pin 15 by the walls of the slot 12 to rotate the nut 16 and advance the latter on its threaded spindle to form a new rest position for its piston upon release of the brake.

When the operator removes his foot from the brake pedal, brake fluid is withdrawn via the fitting 9 and the spring 25, seated between members 31 and 33 in each wheel brake cylinder, urge the pistons 6 and 6a to the left and right, respectively, through the distances $S_1$ and $S_2$ until they seat against the respective nuts 16. During this return movement, the pin 15 cams each sleeve 11 angularly through the distance 10a to position the adjusting mechanism for a subsequent operating cycle.

To reset the bolt 17, one need only loosen the nut 26 and turn the bolt 17 with an Allen wrench or a similar tool. Resetting the bolt 17a can be done either by turning the worm 28 as shown in FIG. 3, or by rotating the gear 42 shown in FIG. 6. In all cases, the resetting is carried out from outside the housing 2, 2a thus obviating the necessity of dismantling the entire brake to do this, as in prior art devices.

A pull on the handle 41 rotates the spindle 20 clockwise and forces the bolt 17a, through the link 21, to the left thereby bringing the brakeshoe 5a into contact with the disc 1. Then, on either deformation of the disc 1, or bending at 29, the other braking surface of the disc 1 is brought into contact with the shoe 5 and clamped. For best results the threads of the bolts 17 and 17a are substantially nonreversible such that axial pressure can be exerted through them onto the disc 1, and vice versa.

A further advantage of nonreversible threads is that the brake shown can be connected to a dual-network brake system with the cylinder 3 connected to one network and the cylinder 4 to another. Since the piston 6 or 6a will not be driven back on the bolt 17 or 17a, respectively, failure of one network will still ensure braking.

A second mechanical actuation system with a lever such as lever arm 18 can be provided for the piston 6 if desired, in which case resetting mechanism as shown in FIG. 3 or 6 must be provided to reset that piston 6.

Furthermore, although the present invention has been described in particularity with reference to a fixed-saddle disc brake, it is to be understood that the adjustment mechanism is equally applicable to other types of hydraulic, pneumatic, and mechanical brakes needing such a device.

The improvement described and illustrated is believed to admit of many modifications within the ability of persons skilled in the art, all such modifications being considered within the spirit and scope of the invention except as limited by the appended claims.

We claim:

1. An adjustment mechanism for a piston axially displaceable from a rest position in one direction away from a rear wall of a cylinder, said mechanism comprising:
   a spindle having one normally nonrotatable end mounted on said rear wall and another end extending toward said piston, said one end being formed as a driven gear;
   a nut threadedly receiving said other end and forming an abutment engageable with said piston and limiting the axial stroke of said piston in the direction opposite said one direction, thereby establishing said rest position;
   cam means between said nut and said piston and having a unidirectional clutch cooperating with said piston for unidirectionally rotating said nut to advance said rest position on the piston stroke exceeding a predetermined value; and
   resetting means operable externally of said cylinder and including a driving gear mounted on said cylinder and meshing with said driven gear for rotating said spindle and retracting said nut, said gears enabling axial displacement of said driven gear with said spindle; and means for axially displacing said spindle away from said rest position.

2. A disc brake comprising a rotatable brake disc and a nonrotatable caliper straddling said disc and having a pair of nonrotatable lobes on opposite sides of said disc, each of said lobes having a respective cylinder with a respective piston and an adjustment mechanism, each mechanism comprising:
   a spindle having one normally nonrotatable end mounted on the rear wall or the respective cylinder and another end extending toward the respective piston;
   a nut threadedly receiving said other end and forming an abutment engageable with the respective piston and limiting the axial stroke thereof in a direction toward said rear wall, thereby establishing a rest position for the piston;
   cam means between said nut and the respective piston and having a unidirectional clutch cooperating therewith for unidirectionally rotating said nut to advance the rest upon the stroke of the piston exceeding a predetermined value, said disc brake further comprising:
   a pair of brakeshoes respectively disposed between each of said pistons and the confronting braking surface of said disc, said brakeshoes being urged against said disc by said pistons;
   mechanical actuating means operatively connected to at least one of the spindles of the respective adjustment mechanism for displacing same toward said disc and thereby bringing the respective brakeshoe into engagement with said disc
   each cam means of the adjustment mechanism comprising a respective camming sleeve surrounding the respective nut and being formed with a skew slot, said nuts each having a respective radial pin engaging in the respective slot, each cam means further comprising a respective torsion spring between its pin and sleeve; and
   each of said sleeves being formed with a respective notch having a predetermined width, each unidirectional clutch of said mechanism including a respective spring body engaging the respective piston and having an end received with angular play in the respective notch.

3. A disc brake as defined in claim 2 wherein each of said spindles projects outwardly from the respective cylinder and is provided with resetting means externally of said caliper for rotating said spindles and retracting said nuts.

4. An adjustment mechanism for a piston axially displaceable from a rest position in one direction away from a rear wall of a cylinder, said mechanism comprising:
   a spindle having one normally nonrotatable end mounted on said rear wall and another end extending toward said piston;
   a nut threadedly receiving said other end and forming an abutment engageable with said piston and limiting the axial stroke of said piston in the direction opposite said one direction, thereby establishing said rest position;
   cam means between said nut and said piston and having a unidirectional clutch cooperating with said piston for unidirectionally rotating said nut to advance said rest position on the piston stroke exceeding a predetermined value; and
   resetting means operable externally of said cylinder for rotating said spindle and retracting said nut, said cam means comprising a camming sleeve surrounding said nut and formed with a skew slot, said nut having a radial pin slidably received in said slot whereby axial displacement of said sleeve with said piston angularly displaces said nut, and a torsion spring yieldably interconnecting said pin and said sleeve.

5. The adjustment mechanism defined in claim 4 wherein said one end projects outwardly of said cylinder and is provided with a removable locking nut threadedly engaged with said one end, said resetting means including a formation on said one end adapted to coact with a tool for rotating said spindle.

6. The adjustment mechanism defined in claim 4 wherein said resetting means includes gear means operatively engaging said one end for rotating same.

7. The adjustment mechanism defined in claim 4 wherein said spindle is formed with substantially self-blocking screw threads.

8. The adjustment mechanism defined in claim 4 wherein said piston has a hollow interior open in said opposite direction, said sleeve being formed with a radial notch, said unidirectional clutch including a spring body frictionally engaging said interior of said piston and having an end received in said notch with an angular play defining the predetermined value of said stroke.

9. The adjustment mechanism defined in claim 4, further comprising mechanical actuating means for said piston for displacing same in said one direction, said actuating means being operatively connected with said spindle for axially displacing same to thereby displace said piston.